(12) United States Patent
Martin, Jr. et al.

(10) Patent No.: US 6,238,554 B1
(45) Date of Patent: May 29, 2001

(54) FUEL FILTER INCLUDING SLOW RELEASE ADDITIVE

(75) Inventors: Harold R. Martin, Jr.; David M. Stehouwer, both of Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/333,556

(22) Filed: Jun. 16, 1999

(51) Int. Cl.$^7$ .................................................. B01D 27/04
(52) U.S. Cl. ..................... 210/109; 123/1 A; 123/464; 210/149; 210/192; 210/206; 210/209; 422/110; 422/264; 422/278
(58) Field of Search ................. 123/1 A, 464; 210/742, 97, 109, 149, 192, 206, 209; 422/443, 444, 261, 263, 264, 274, 277, 278, 283, 108, 109, 110

(56) References Cited

U.S. PATENT DOCUMENTS

| | | | |
|---|---|---|---|
| 3,235,084 | * 2/1966 | King et al. ............................ | 210/149 |
| 3,314,884 | 4/1967 | Cover .................................... | 252/10 |
| 3,336,223 | 8/1967 | Kneeland ............................... | 252/9 |
| 3,645,402 | 2/1972 | Alexander et al. ................... | 210/266 |
| 3,749,247 | 7/1973 | Rohde .................................... | 210/205 |
| 4,075,098 | 2/1978 | Paul et al. ............................ | 210/168 |
| 4,091,265 | * 5/1978 | Richards et al. ..................... | 210/184 |
| 4,274,837 | 6/1981 | Lilburn .................................. | 44/63 |
| 4,452,697 | 6/1984 | Conrad .................................. | 210/172 |
| 4,717,495 | 1/1988 | Hercamp et al. ..................... | 252/75 |
| 4,782,891 | 11/1988 | Cheadle et al. ...................... | 165/134.1 |
| 4,933,077 | * 6/1990 | Wolf ...................................... | 210/187 |
| 5,009,848 | 4/1991 | Secretarski et al. .................. | 422/62 |
| 5,024,268 | 6/1991 | Cheadle et al. ...................... | 165/134.1 |
| 5,050,549 | 9/1991 | Sturmon ................................ | 123/198 |
| 5,094,745 | 3/1992 | Reynolds .............................. | 210/266 |
| 5,209,842 | 5/1993 | Moor ..................................... | 210/168 |
| 5,249,552 | 10/1993 | Brooks .................................. | 123/1 |
| 5,395,518 | 3/1995 | Gulsvig ................................. | 210/132 |
| 5,435,346 | 7/1995 | Tregidgo et al. ..................... | 137/564.5 |
| 5,456,217 | 10/1995 | Thunker et al. ...................... | 123/1 A |
| 5,492,696 | 2/1996 | Price et al. ........................... | 424/417 |
| 5,507,942 | 4/1996 | Davis. .................................... | 210/94 |
| 5,591,330 | 1/1997 | Lefebvre ............................... | 210/203 |
| 5,662,799 | 9/1997 | Hudgens et al. ...................... | 210/192 |
| 5,741,433 | 4/1998 | Mitchell et al. ...................... | 252/74 |
| 5,772,873 | 6/1998 | Hudgens et al. ...................... | 210/192 |
| 5,803,024 | 9/1998 | Brown .................................. | 123/41.15 |

FOREIGN PATENT DOCUMENTS 0 376 563 A1    7/1990   (EP) .

* cited by examiner

*Primary Examiner*—Peter A. Hruskoci
(74) *Attorney, Agent, or Firm*—Woodard, Emhardt, Naughton, Moriarty & McNett (57) ABSTRACT

This invention relates to a fuel filter for use with internal combustion engines. The fuel filter includes a fuel additive that can be released into fuel. The rate of release for the fuel can be controlled. In one form the fuel additive can be released a substantially constant rate to maintain a uniform level of fuel additive in the fuel. Use of the present invention provides a fuel filter having an extended life span that is longer than fuel filters typically used with combustion engines.

19 Claims, 6 Drawing Sheets

FUEL FILTER INCLUDING SLOW RELEASE ADDITIVE

FIELD OF THE INVENTION

The present invention relates generally to a fuel filter for use with internal combustion engines, for example, but not limited to diesel engines in commercial vehicles. More specifically, the present invention is directed to a fuel filter containing a fuel additive that can be released into fuel and a method of releasing the additive into the fuel.

BACKGROUND OF THE INVENTION

Fuel filters are necessary components used to protect combustion engines by filtering out contaminants and thereby preventing damage to the engine and other downstream components such as valves, fuel injectors, fuel lines and related components. Fuel can entrain a wide variety of contaminants from a number of sources. Frequently fuel oxidizes and forms resinous materials such as asphaltenes commonly referred to as varnishes. Bacteria can grow in fuel, particularly fuel that contains moisture. The growing bacteria forms a "slime" on inner surfaces of fuel tanks, fuel lines and fuel filters. The slime often sloughs off the surfaces and fuel transports the free slime through the fuel lines. The fuel filter filters out the varnishes and bacteria; however, in the process the varnish and bacteria block the fuel filter element. The blocked filter exhibits a reduced fuel flow and increases the pressure differential across the filter element, thereby reducing engine performance and fuel efficiency. To maintain engine performance and reliability, the fuel filters must be replaced, often as frequently as every 2,000 to 4,000 vehicle miles. For many vehicles, particularly commercial trucks that travel hundreds or even thousands of miles a month, this significantly increases vehicle maintenance and operating costs and can reduce reliability.

Fortunately, the formation of varnishes and bacteria growth can be inhibited by adding fuel additives such as antioxidants and biocides to the fuel. Dispersants can be added to break up and dissolve some of the existing material clogging the filters and other fuel related components. To be effective, the additives must be constantly maintained in the fuel. This is often difficult. Unlike other fluid systems, such as the coolant and oil systems, the fuel system does not re-circulate all of the fluid. Therefore, the additives must be continuously added to the fuel at a controlled rate.

It is difficult to maintain a constant or desired level of an additive in the fuel. Typically an operator adds a bottled additive to the vehicle fuel tank with each fuel fill-up. While many bottled fuel additives are commercially available, often operators do not consistently add the additive with each fill-up. The additive might not be readily available or the operator may forget to include the additive. When the additive is added to the fuel tank, it does not always form a homogeneous mixture with the fuel. Fuel tanks do not include reliable methods for mixing fuel. Generally operators rely upon the turbulence created during a fill-up and by vehicle motion to mix the additive and fuel. Furthermore, the additive concentration in the fuel may vary, depending upon the amount of fuel added—assuming a set amount of additive is added with each fill-up.

The following references provide a background for filters in general that contain additives.

Davis in U.S. Pat. No. 5,372,942 describes a pressurized fuel filter having an additive embedded in wax; the wax/additive composition dissolves when contacted with fuel. Additional additive is only added when a portion of the fuel becomes clogged and the fuel level in the filter rises to contact and dissolve additional amounts of the wax/additive composition.

Lefebvre in U.S. Pat. No. 5,591,330 discloses an oil filter that includes a thermoplastic material having oil oxidation and acidification additives. The hot oil recirculating through the engine and the filter dissolves that thermoplastic material thereby releasing the additives into the oil.

Hudgens in U.S. Pat. No. 5,662,799 discloses a coolant filter for recirculating coolant. The coolant filter includes a supplemental coolant additive (SCA) and a release means to maintain the concentration of SCA already dissolved in the recirculating coolant fluid.

One of the design challenges addressed by the present invention is how to control the release of fuel additive into the fuel. The present invention solves this challenge in several ways, each of which is believed to be a novel and unobvious solution. The solution avoids the undesirable side effects, which have already been described and can be exploited to increase the maintenance interval, increase the fuel filter life span and enhance engine performance and fuel efficiency.

SUMMARY OF THE INVENTION

In one form the present invention provides a fuel filter for filtering fuel and adapted to release a fuel additive into the fuel at a controlled rate. The fuel filter comprises a housing assembly including an inlet and an outlet for fuel and defining an interior chamber; a filter element disposed within the interior chamber; a source of fuel additive disposed within the interior chamber; and a slow release means for controlling the rate of release of the fuel additive into the fuel. The slow release means is positioned between the source of fuel additive and the fuel outlet.

In another form the present invention provides a fuel filter for filtering fuel and adapted to release a fuel additive into the fuel. The fuel filter comprises an outer housing assembly defining a filter chamber, an inlet and an outlet for fuel; a filter element disposed within the filter chamber and positioned between the inlet and the outlet for fuel; an inner housing assembly positioned within the filter chamber, the inner housing assembly defining an inner chamber in fluid communication with the filter chamber; a source of a fuel additive disposed within the inner chamber; and a diffusion controlled orifice positioned between the source of fuel additive and the fuel outlet.

In another form the present invention provides a method of releasing a fuel additive into fuel. The method comprises: providing a fuel filter containing a fuel additive, the fuel filter positioned between a source of fuel and an internal combustion engine; contacting a portion of the fuel additive with a portion of the fuel to provide a fuel composition comprising fuel additive; and allowing the fuel composition to admix with the fuel.

One object of the present invention is to provide an improved fuel filter containing a fuel additive.

Further objects, features and advantages of the present invention shall become apparent from the detailed drawing and the descriptions provided herein.

DETAILED DESCRIPTION OF THE INVENTION

For the purposes of promoting an understanding of the principles of the invention, reference will now be made to the embodiments illustrated in the drawings and specific language will be used to describe the same. It will, nevertheless, be understood that no limitation of the scope of the invention is thereby intended. Any alterations and further modifications in the described processes, systems, or devices and any further applications of the principles of the invention as described herein are contemplated as would normally occur to one skilled in the art to which the invention relates.

Figure 1:
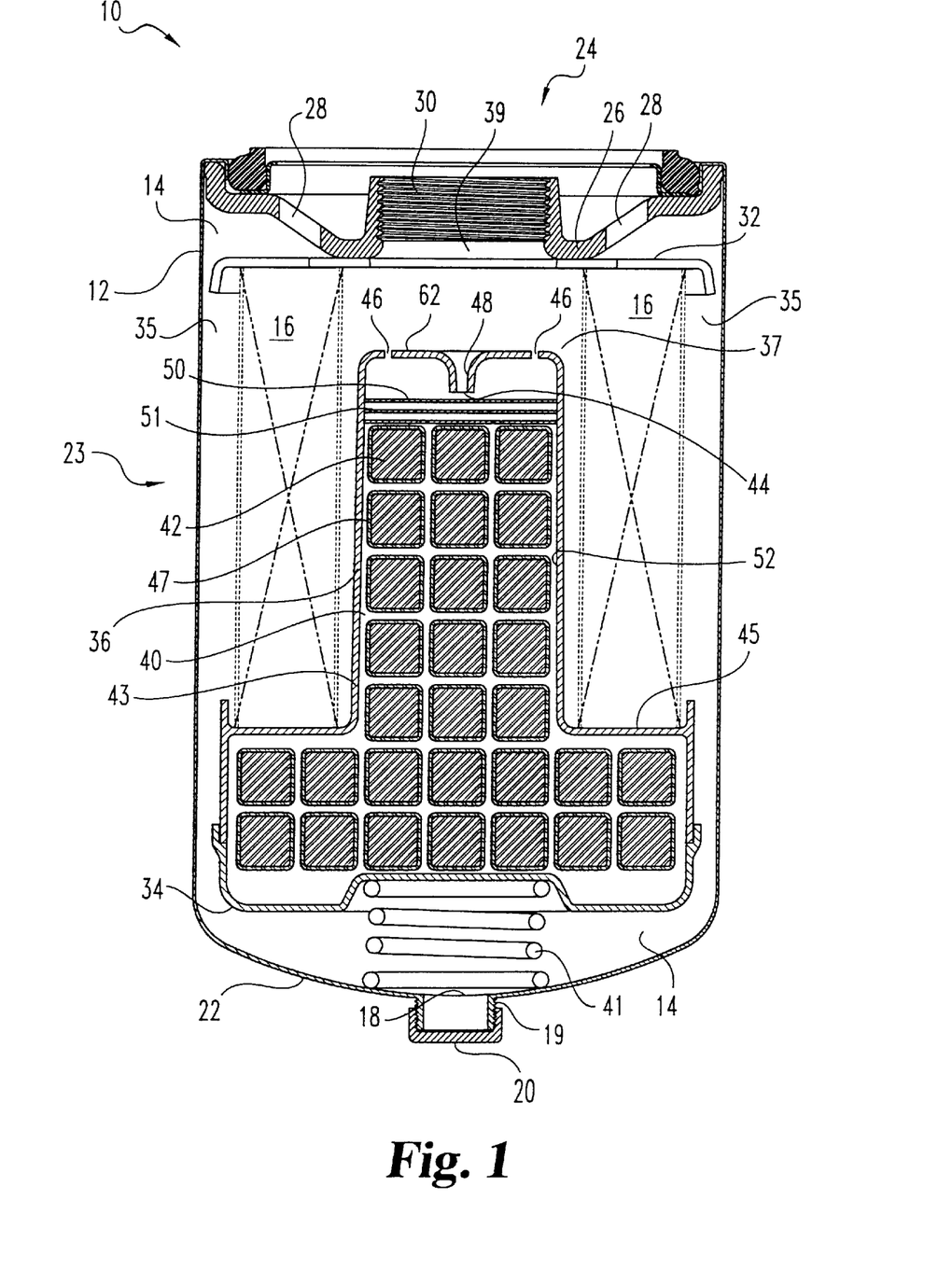
FIG. 1 is a front elevational view in full section of one form of a fuel filter according to the present invention.

Referring to FIG. 1, there is illustrated a fuel filter 10 according to one embodiment of the present invention. The illustrated embodiment of filter 10 is intended to include basic components in a construction that is typical of such fuel filters with the exception of the fuel additive and the slow-release means associated with the fuel additive. The basic components of filter 10 include housing 12 defining a filter chamber 14, filter element 16 disposed within the filter chamber 14, drain opening 18 having an externally threaded wall 19, and cap 20 having internal threads adapted to matingly engage externally threaded wall 19.

Housing 12 includes a closed base end 22 and an open outlet end 24, which is crimped to the outer edge periphery of nut plate 26. The crimped combination creates a filter house assembly 23. Nut plate 26 provides the inlet openings 28 for fuel to enter filter 10. Internally threaded outlet aperture 30, which is defined by nut plate 26, provides the flow exit for the filtered fuel.

Filter element 16 is supported on one end by outlet end plate 32 and on an opposite end by base plate 34. Filter element 16 is bonded to end plate 32 to form a fluid tight seal. Fuel enters filter chamber 14 through inlet 28 and flows to annular space 35. From annular space 35, fuel flows radially inward through filter element 16 into an interior region 37, then out through opening 39 of outlet 30. From outlet 30, fuel flows to a combustion engine, which can include an carburetor system or fuel injection system (not shown).

Base end plate 34 provides a support and a seat for filter element 16, as well as for the components associated with the present invention, including the filter additive which is provided in the form of a plurality of tablets or pellets 42. In the embodiment illustrated by filter 10 base plate 34 is spaced from housing 12 by spring 41.

The foregoing description of the basic filter components and construction of fuel filter 10 is provided with regard to FIG. 1 and is applicable to the filter elements depicted in FIGS. 3–6. Accordingly the same reference numerals will be used for the same components. The differences between filters illustrated in FIGS. 1 and 3–6 are embodied in the structures that house a plurality of coated pellet tablets 42.

Referring to FIG. 1, fuel filter 10 includes cap 36 and base plate 34, which matingly join together to form inner chamber 40. Cap 36 is substantially cylindrical and includes an upper portion 43 sized to have an outside diameter smaller than the inside diameter of filter chamber 14. Cap 36 includes an annular shelf 45 and an upper wall portion 62. Annular shelf 45 provides support for filter element 16 and is adapted to form a fluid tight seal with the lower portion of filter element 16. Upper wall portion 62 includes orifice 44, which provides fluid communication between inner chamber 40 and inner region 37. The upper wall portion can also include at least one, preferably two, vent openings 46. Upper wall 62 includes an axially protruding tapered diffusion tube 48. Diffusion tube 48 defines a tapered diffusion passageway for orifice 44, which extends therethrough and establishes a passageway of fluid communication between the inner chamber 40 and inner region 37.

Figure 2:
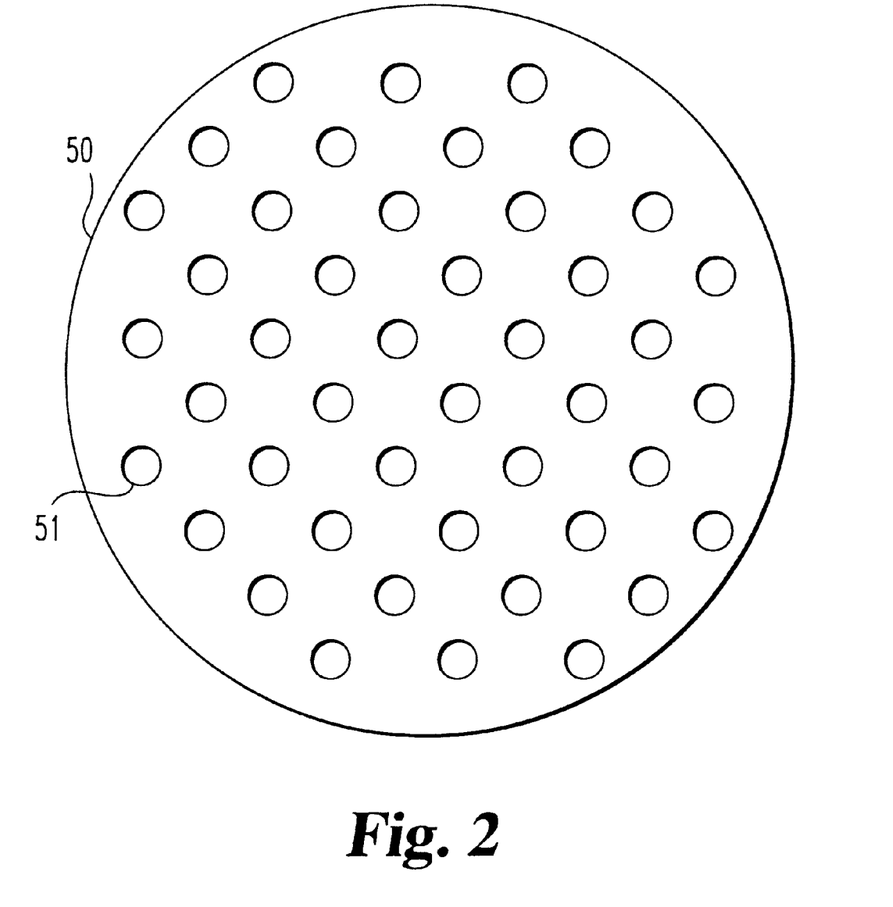
FIG. 2 is a top plan view of a baffle plate for use with the fuel filter of FIG. 1.

Referring additionally to FIG. 2, there is illustrated a typical baffle plate 50 for use with the present invention. Cap 36 can include, but is not required to include, at least one, preferably a plurality, of baffle plates 50. Each baffle plate 50 includes a plurality of openings 51 formed therethrough. Baffle plate 50 is spaced from diffusion tube 48. In preferred embodiments, cap 36 includes three baffle plates 50 spaced from each other; each baffle plate individually bonded about its peripheral edge to inner surface 52 of cap 36. It will be appreciated that in alternative forms cap 36, which includes at least one baffle plate 50, need not include a diffusion control orifice or the diffusion tube 48. When thus provided, cap 36 has an opening providing fluid communication with filter chamber 12 and includes a sufficient number of baffle plates 50 to slow the flow of fuel into inner chamber 40 and/or to control the rate of release of the fuel additive. Further, a plurality of baffle plates 50 can be provided to reduce turbulence in inner chamber 44. Preferably, each baffle plate 50 is spaced from an adjacent baffle plate to misalign the plurality of openings 51 in the adjacent baffle plates.

As is illustrated in FIG. 1, cap 36 seats on base plate 34 and forms an inner housing 43 assembly that defies inner chamber 40. The only openings into innere the diffusion orifice 44 and vent openings 46. Inner chamber 40 is substantially filled with a fuel additive composition, which is illustrated in a form of a tablet 42. It is understood that the fuel additive composition can be provided in a variety of shapes and sizes, including cubic, cylindrical, and spherical. Typically, tablets 42 are provided in a cubic shape to fill the inner chamber 40.

Fuel from filter chamber 12 in filter 10 migrates through the diffusion orifice 44 into an inner chamber 40. Fuel in inner chamber 40 contacts the outer coating 47 of fuel additive tablet 42. Fuel then diffuses through the coating 47 to contact the fuel additive composition, which dissolves in the fuel to provide a fuel composition comprising the dissolved additive. The fuel composition diffuses back through coating 47 into inner chamber 40. The fuel composition mixes with fuel in inner chamber 40.

The fuel system is unlike the coolant and oil systems used with internal combustion engines because in some duty cycles the fuel system does not recirculate a significant portion of fluid. Therefore, under these conditions, the majority of fuel entering into filter chamber 14 has not been recirculated through filter 10 and for all practical purposes does not include any dissolved additive. While not intending to be bound by any theory, it is believed that the concentration of dissolved additive in the fuel composition in inner chamber 40 is vastly greater than the concentration of dissolved additive in the fuel in filter chamber 14 outside inner chamber 40. This concentration difference is significantly greater than would be expected in a recirculating fluid system. This concentration difference creates a stronger driving force for the fuel composition to migrate from inner chamber 40 into filter chamber 40. In preferred embodiments, baffle plate 50 and/or diffusion orifice 44 are provided to inhibit or reduce the flow of fuel into and out from inner chamber 40. This increases the useful lifespan of fuel filter 10 and controls the rate of release of the fuel additive composition into the fuel.

Inner chamber 40 provides a substantially quiescent region inside filter chamber 12 that does not experience the currents created by fuel flowing through filter 10. As the concentration of dissolved fuel additive in inner chamber 40 increases relative to concentration of the fuel additive in filter chamber 12, the fuel composition migrates or diffuses from inner chamber 40 into filter chamber 12 in an effort to achieve equilibrium. The fuel composition comprising the dissolved additive and the fuel diffuses through diffusion tube 48 and diffusion orifice 44 that defines a restricted opening for the migration of the higher concentration solution out of the inner chamber 40 and mixes with fuel in filter chamber 14.

The fuel additives for use in this invention can be of liquid or solid form. Two or more fuel additives can be combined to form a fuel additive composition. The fuel additive(s) can be compounded with a suitable polymer either for providing a solid or semisolid material such as tablet 42 or form for providing a matrix to control the rate of release of the additive into the fuel. The fuel additive can further include a wide variety of binders, compounding agents and mold release agents. When the additive is provided in liquid form, it is preferable, but not required, to combine the liquid fuel additive with a suitable agent to form a solid or semisolid material. As used herein, the term fuel additive includes any commercially known and/or commonly used fuel additive that imparts beneficial properties to the fuel and/or the engine and related fuel-handling components. Common classes of fuel additives include: antioxidants, antiwear agents, cetane improvers, corrosion inhibitors, demulsifiers, detergents, dispersants, flow improvers, lubricity agents, and metal deactivators.

Tablets 42 of fuel additive include an outer hydrocarbon insoluble coating 47, which encases the fuel additive composition tablet 42. The hydrocarbon insoluble coating is selected to be substantially insoluble in hydrocarbon fuel mixtures, yet be permeable to the fuel to allow the fuel to penetrate the coating and contact the fuel additive. A portion of the fuel additive dissolves in the fuel to provide a fuel composition that includes the dissolved fuel additive. The coating may be a hard coating or a soft pliable coating. In general, any coating material can be used with this invention, provided the coating allows fuel access to the fuel additive composition and does not harm downstream fuel systems, fuel injectors, valves and related engine components.

Typical and preferred coating materials are commercial available polymers co-polymers and block copolymers including, but not limited to: polyethylene glycol or polyvinyl acetate and mixtures thereof. Preferably the coating is selected to provide an effective rate of release of the additive into the fuel. By effective rate of release, it will be understood that the additive is released at a concentration sufficient to provide beneficial properties to the fuel and related fuel-handling components.

In other embodiments, the fuel additive can be embedded within a solid matrix. The matrix can be either hydrocarbon soluble or hydrocarbon insoluble. If the matrix material is hydrocarbon insoluble, the fuel must be able to penetrate the matrix and contact the fuel additive. It is particularly advantageous to embed a liquid fuel additive in a solid matrix. This provides one means of controlling the rate the additive is released into fuel.

One alternative design of FIG. 1 includes replacing the plurality of coated tablets 42 with a fewer number of much larger pellets or tablets. By reducing the total surface area of the fuel additive for a specific mass of fuel additive composition, the additive composition dissolves at a slower rate.

Figure 3:
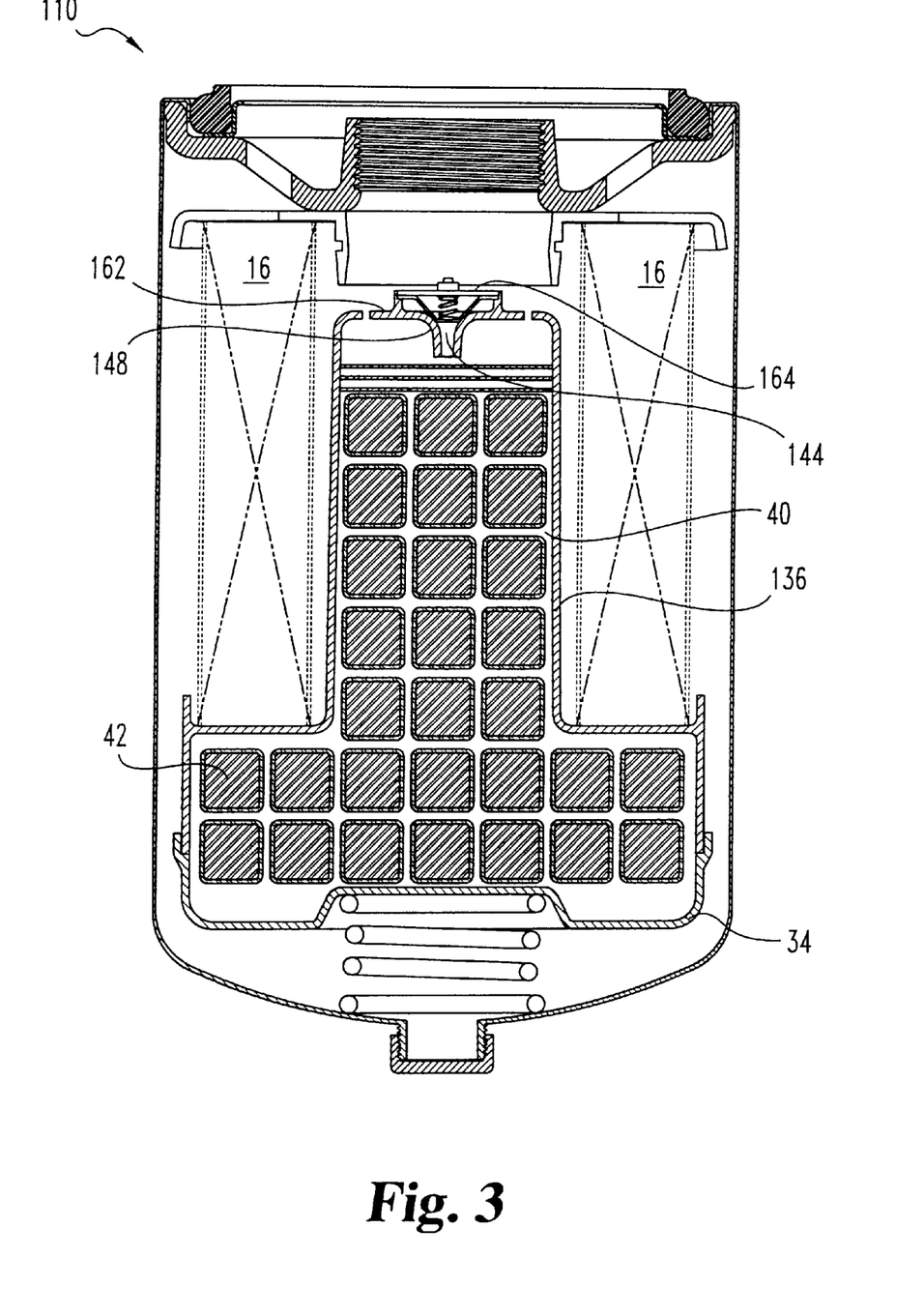
FIG. 3 is a front elevational view in full section of an alternative embodiment of a fuel filter comprising a thermostat according to the present invention.

Referring now to FIG. 3, an alternative embodiment of the present invention is illustrated. As has been previously mentioned, the basic filter components of filter 110 are the same as those of filter 10, and accordingly, the same reference numbers have been used for the basic components. Alternative and additional components are referenced with a one hundred prefix designation. Located within filter 110 is cap 136 and base plate 34. Cap 136 includes opening 144 formed therethrough. Opening 144 can be provided in the form of a diffusion orifice that is defined by a diffusion tube 148. Thermostat 164 is provided in opening 144. Thermostat 164 is adapted to control the flow of fuel into inner chamber 40 and can be selected from a wide variety of commercially available thermostats. For example, a wax type thermostat can be adapted for use in the present invention. In preferred operation, the thermostat opens in response to a temperature level of fuel in filter 110. When opened, the thermostat allows passage of fuel into inner chamber 40. The thermostat 164 can be adapted to open in response to either fuel that is sufficiently warm or fuel that is sufficiently cool.

In one preferred embodiment, thermostat 164 opens in response to fuel that is sufficiently warm. Fuel additives providing additional benefits to warm fuel can be released on an as-needed release basis. For example, antioxidants and dispersants can be added to the warm fuel to inhibit the deposition of resinous material on filter element 16. Dispersions can be provided to suspend or dissolve the resinous material, which are eventually burned in an engine (not shown). In alternative embodiments, the thermostat 164 opens when fuel in filter 110 is sufficiently cool. Cool fuel can be indicative of a recently filled tank or of fuel that has not been recirculated through the fuel filter. In either case, the cool fuel may require additional additives to enhance engine performance and/or fuel efficiency. Under certain conditions fuel is circulated through the fuel injection where it becomes heated. The heated fuel can be recirculated through the fuel filter. Since the fuel has already been through the fuel filter, no additional additive may be needed. Thus, when the fuel is sufficiently warm, thermostat 164 can close and prevent the addition of the fuel additive to the heated fuel.

As an additional benefit, tablets 42 can include an antigelling agent for diesel fuel. Thermostat 164 can operate to open in response to cool or cold fuel. The anti-gelling additives can be released on a need-release basis into the fuel to enhance engine performance in cold weather.

Fuel filter 110 can also include, but is not required to include, one or more baffle plates 150. Similar to the design of fuel filter 10, baffle plates 150 are positioned in inner chamber 40 adjacent to opening 144 in upper wall 162.

Figure 4:
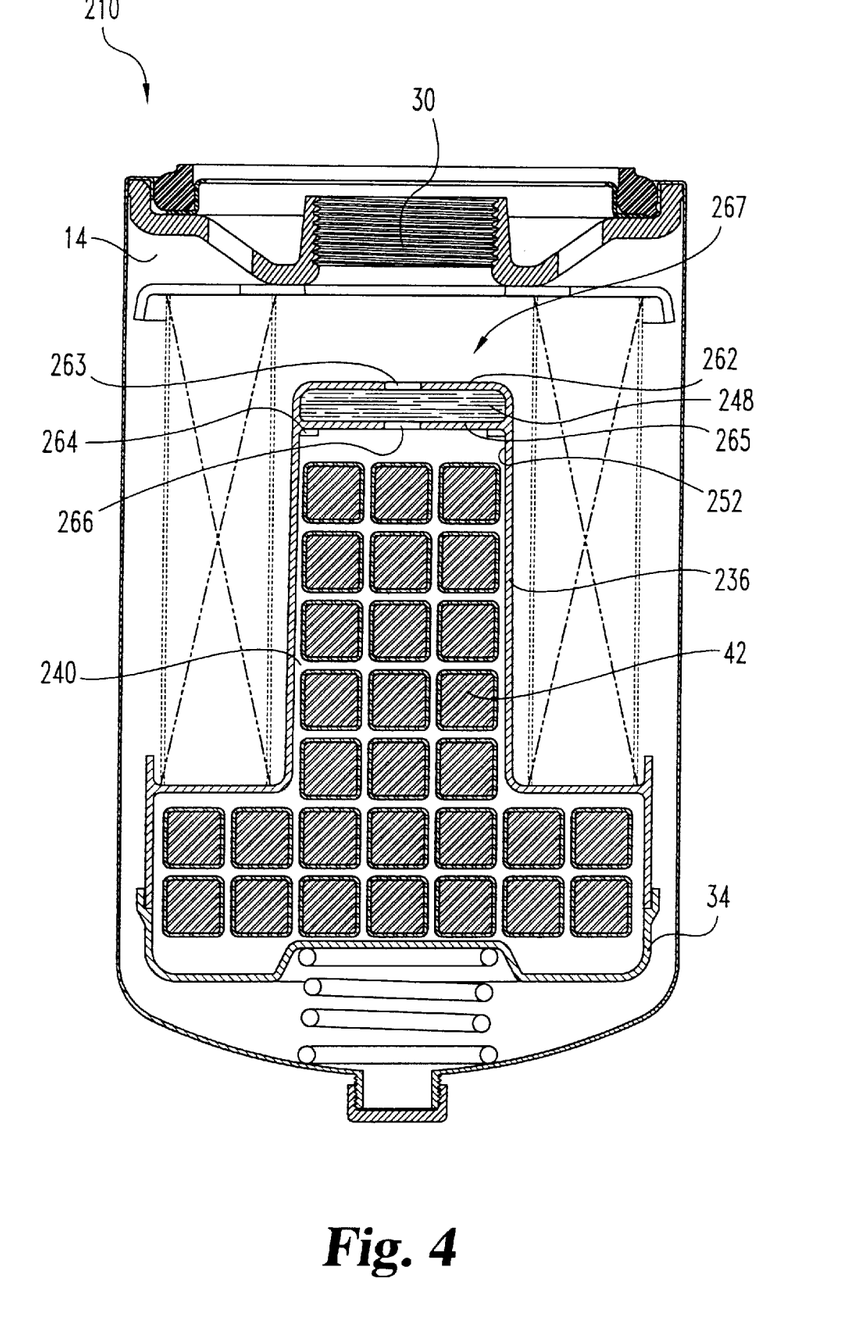
FIG. 4 is a front elevational view in full section of an alternative embodiment of a fuel filter comprising a semi-permeable membrane according to the present invention.

Referring now to FIG. 4, another embodiment of the present invention is illustrated. The basic filter components of filter 210 are the same as those of filter 10, and accordingly, the same reference numbers have been used for the basic components. Alternative and additional components are referenced with a two hundred prefix designation. Located within filter 210 is a cap 236 and base plate 34. Cap 236 includes a double wall structure 267 that includes a semi-permeable membrane wafer sandwiched therebetween.

Cap 236 includes inner surface 252. Inner surface 252 includes a unitary upper wall 262, which defines centrally therein an orifice 263. The inner surface 252 includes molded thereon a small annular lip 264 which serves as a retainer for circular plate 265. Plate 265 functions as a second wall in cooperation with upper wall 262 to hold in position therebetween a substantially cylindrical diffusion or osmotic wafer 248. The preferred material for diffusion wafer 248 is a microporous polymer, co-polymer or block copolymer including, but not limited to: polyethylene glycol or polyvinyl acetate and mixtures thereof. Plate 265 defines centrally therein an opening 266, which is aligned with opening orifice 263. This combination permits the gradual migration of fuel into inner chamber 240 to contact tablets 42. Osmotic wafer 248 is positioned between the fuel additive and the outlet aperture 30 through which the filtered fuel containing the fuel additive flows on toward the engine (not shown). Use of the semi-permeable membrane in the form of membrane 248 permits only a gradual migration of a portion of fuel in filter chamber 14 into inner chamber 240. This provides a slow release of the fuel additive composition into the fuel to maintain a substantially constant level of fuel additive in the fuel system.

Figure 5:
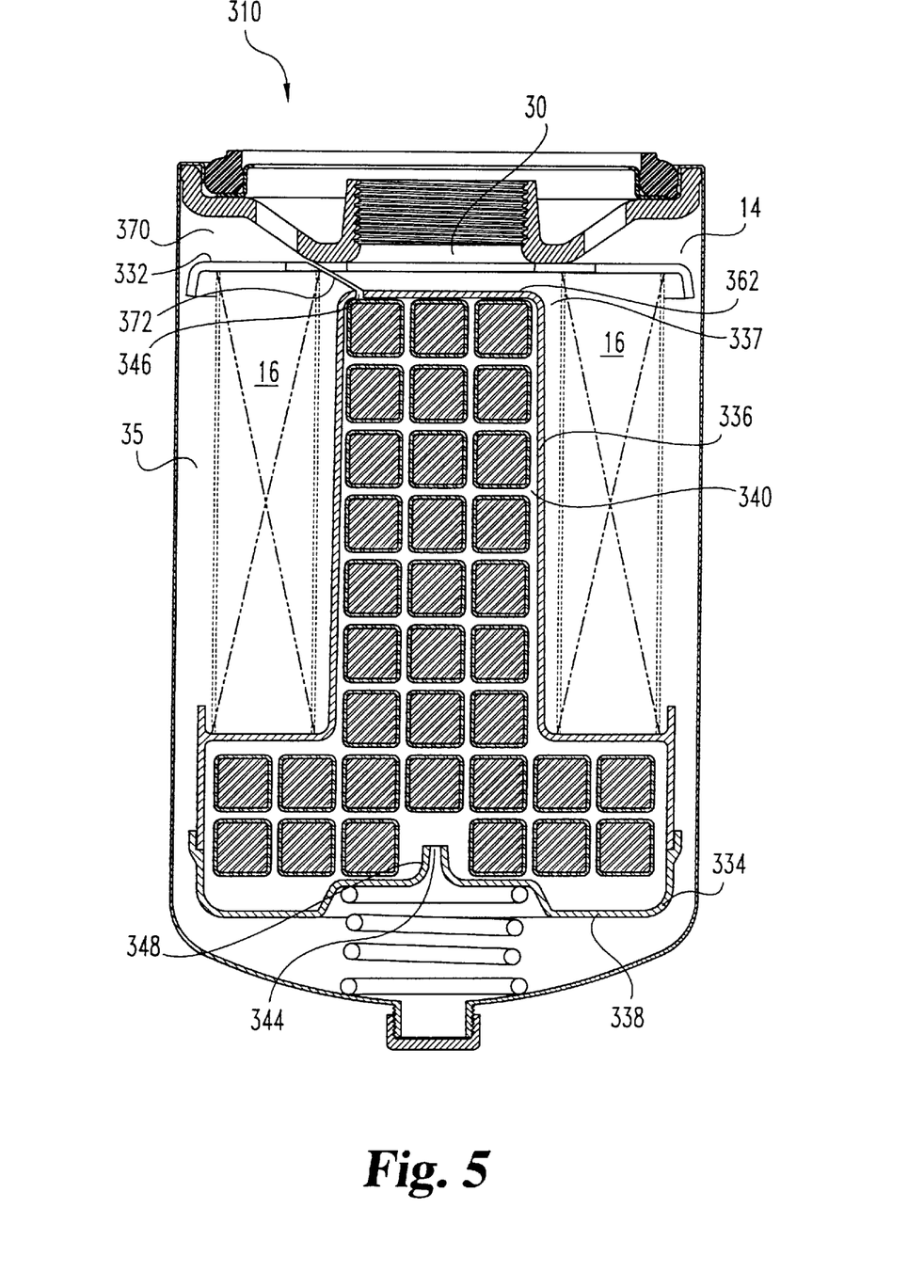
FIG. 5 is a front elevational view in full section of another embodiment of a fuel filter according to the present invention.

In FIG. 5 there is illustrated yet another embodiment of the present invention. The basic filter components of filter 310 are the same as those of filter 10, and accordingly, the same reference numbers have been used for the basic components. Alternative and additional components are referenced with a three hundred prefix designation. Filter 310 includes base plate 334 having a lower wall portion 338. Lower wall portion 338 includes orifice 344 formed therethrough which provides fluid communication between inner chamber 340 and filter chamber 314. Lower wall 338 also can include an axially protruding tapered diffusion tube 348. Diffusion tube 348 defines a tapered diffusion passageway for orifice 344 that extends therethrough and establishes a passageway of fluid communication between the inner chamber 340 and filter chamber 314.

Preferably upper wall 362 of cap 336 includes at least one air vent opening 346. In one alternative form, outlet endplate 332 can include a substantially circular, hollow vent tube 372 extending obliquely therefrom and adapted to extend from outlet endplate 332 through air vent opening 346 to provide fluid communication between region 370 that is proximate to inlet 328 and inner chamber 340. In an alternative form, the outlet end plates does not include vent tube 372, and air vent opening 346 can vent into the interior region 337 of filter chamber 14. In operation after all the air in inner chamber 340 has escaped through air vent opening 346, a portion of the fuel mixture in inner chamber 340 could flow out air vent opening 346 into interior region 337 and out outlet 30, preferably at a substantially lower flow rate than fuel flows from annular space 35 through filter element 16 and out outlet 30.

Figure 6:
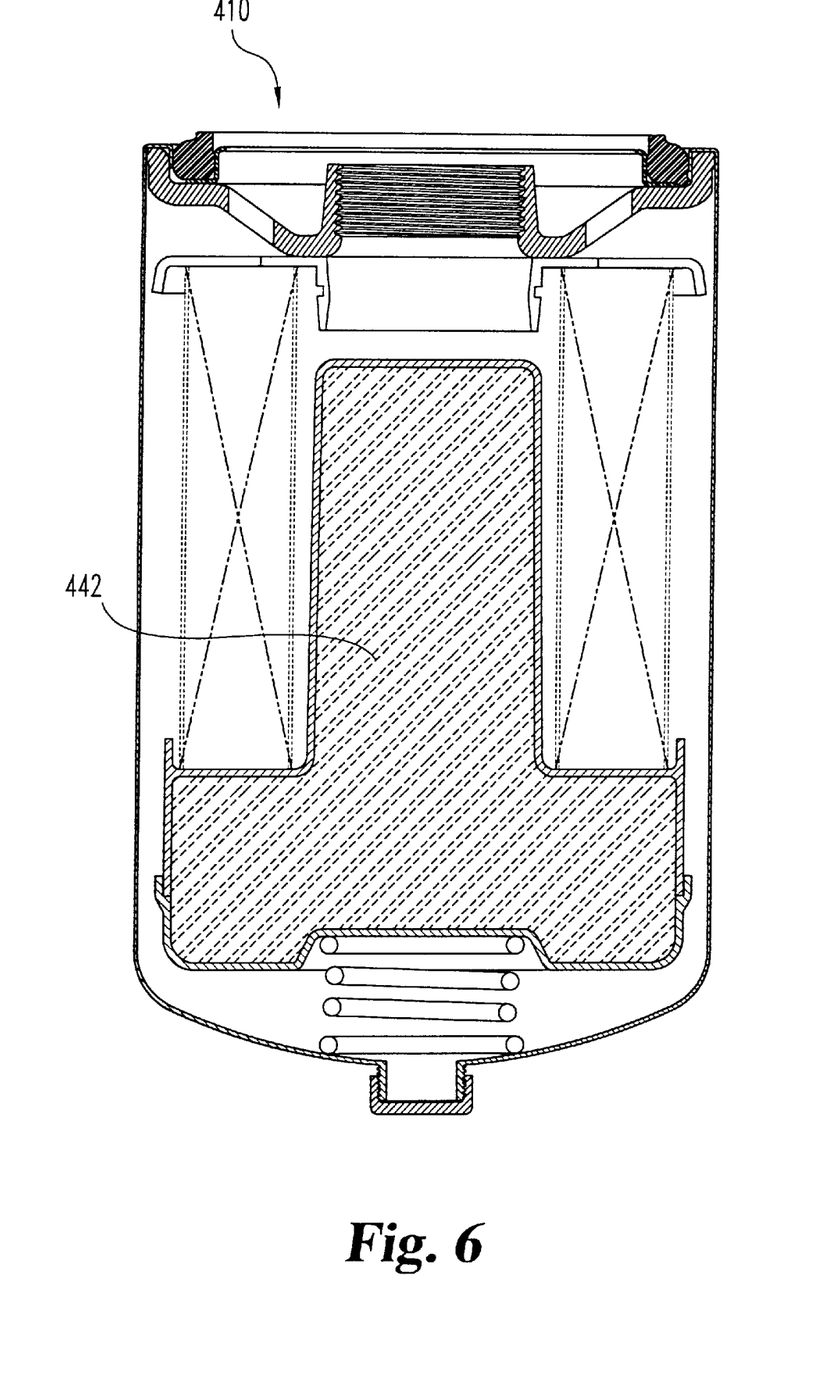
FIG. 6 is a front elevational view in full section of yet another embodiment of a fuel filter comprising a fuel additive briquette according to the present invention.

In FIG. 6 there is illustrated an alternative embodiment of a fuel filter 410 for use with the present invention. Fuel filter 410 includes a fuel additive in a single large tablet or cartridge 442. While it is possible to include fuel additive cartridge 442 in either of FIG. 1 or FIGS. 3–5, the use of smaller coated tablets is preferred. By the use of smaller tablets, a larger mass of the fuel additive can be loaded into the inner chamber without any particular regard to the size or shape of the chamber.

While the foregoing description provided several embodiments for controlling the release of a fuel additive composition into fuel, it will be understood that the inner housing assembly can be formed to include a variety of structures and openings to allow migration of fuel into the inner chamber. In preferred embodiments, the inner chamber provides a quiescent region inside filter chamber where a source of a fuel additive surrounded by a portion of the fuel flowing through the fuel filter is protected from the typical fluid forces acting on the fuel in the filter.

The present invention provides a method of enhancing the operation of an internal combustion engine. In one form, the enhancement is provided by controlling the release of a fuel additive into fuel. The controlled released of the additive maintains a constant, uniform concentration of additive in the fuel. In preferred embodiments, the additive is released in a controlled manner to maintain a substantially uniform concentration of additive in the fuel despite the varying amount of fuel that is recirculated through the fuel filter. Use of the present invention decreases the maintenance time and costs, enhances engine performance and increases fuel efficiency. In another form, the invention enhances the usable and/or effective lifespan of fuel filters by providing fuel additives that effectively inhibit the formation of resinous material such as vanishes and asphaltenes and help breakup or disperse such material that has been deposited on fuel handling components.

According to the present invention, a diffusion tube, diffusion orifice, and baffles may be used to slow the release of the fuel additive into the fuel. The coating on the fuel additive also limits the rate of additive that is dissolved in the fuel. These mechanical and chemical arrangements may be used with a plurality of smaller fuel additive pellets, with a larger tablet, or with a singular, large cartridge of fuel additive. In an alternative embodiment of the present invention, a semi-permeable membrane wafer is sandwiched between an upper wall and a retaining plate to provide a slow release means for the mechanism due to the composition of the wafer. This mechanical arrangement may be used with a plurality of smaller tablets or larger tablets or some other form of fuel additives. Further, a thermostat can be included with the openings for each embodiment to provide a need-release feature for the present invention. The thermostat opens in response to fuel that exhibits a temperature level within a predetermined temperature range and permits migration of fuel into the inner chamber.

While the invention has been illustrated and described in detail in the drawings and foregoing description, the same is considered to be illustrative and not restrictive in character, it is understood that only the preferred embodiments have been shown and described and that all changes and modifications that come within the spirit of the invention are desired to be protected.

What is claimed is:

1. A fuel filter for filtering fuel and adapted to release a fuel additive into said fuel at a controlled rate, said fuel filter assembly comprising:

a housing assembly including an inlet and an outlet for fuel and defining an filter chamber;

a filter element disposed within said filter chamber and positioned between said inlet and said outlet for fuel;

a source of a fuel additive disposed within said interior chamber; and a slow release means for controlling the rate of release of the fuel additive into said fuel, said slow release means including a thermostatically controlled orifice positioned between said source of fuel additive and said fuel outlet.

2. The fuel filter assembly of claim 1 wherein said source of a fuel additive includes a plurality of soluble fuel additive pellets.

3. The fuel filter assembly of claim 2 wherein said soluble fuel additive pellets are coated with a hydrocarbon insoluble coating.

4. The fuel filter assembly of claim 1 wherein the slow release means includes a diffusion orifice.

5. The fuel filter assembly of claim 1 wherein the slow release means includes baffles.

6. The fuel filter assembly of claim 1 wherein the slow release means includes a semipermeable membrane.

7. A fuel filter for filtering fuel and adapted to release a fuel additive into said fuel said fuel filter comprising:

an outer housing assembly defining a filter chamber, an inlet and an outlet for fuel;

a filter element disposed within said filter chamber and positioned between said inlet and said outlet for fuel;

an inner housing assembly positioned within said filter chamber, said inner housing assembly defining an inner chamber in fluid communication with said filter chamber;

a source of a fuel additive disposed within said inner chamber; and     a diffusion controlled orifice and two or more baffled plates spaced from each other and each baffle plate having a plurality of openings misaligned from an adjacent baffle plate positioned between said source of fuel additive and said fuel outlet.

8. The fuel filter of claim 7 wherein said fuel additive is coated with a hydrocarbon insoluble coating.

9. The fuel filter of claim 7 wherein said diffusion controlled orifice includes a thermostat.

10. The fuel filter of claim 7 wherein said diffusion controlled orifice includes a semipermeable membrane.

11. The fuel filter of claim 7 wherein said source of fuel additive includes a plurality of soluble fuel additive pellets.

12. A fuel filter for filtering fuel and adapted to release a fuel additive into said fuel, said fuel filter comprising:

an outer housing assembly defining a filter chamber, an inlet and an outlet for fuel;

a filter element disposed within said filter chamber and positioned between said inlet and said outlet for fuel;

an inner housing assembly positioned within said filter chamber, said inner housing assembly defining an inner chamber in fluid communication with said filter chamber;

a source of a fuel additive disposed within said inner chamber; and     two or more baffle plates spaced from each other and each baffle plate having a plurality of openings misaligned from an adjacent baffle plate positioned between said source of fuel additive and said fuel outlet.

13. The fuel filter of claim 12 wherein said fuel additive is coated with a hydrocarbon insoluble coating.

14. The fuel filter of claim 12 wherein said inner housing assembly includes a thermostat positioned to control fuel flow into said inner chamber.

15. The fuel filter of claim 12 wherein said source of fuel additive includes a plurality of soluble fuel additive pellets.

16. A fuel filter for filtering fuel and adapted to release a fuel additive into said fuel, said fuel filter comprising:

an outer housing assembly defining a filter chamber, an inlet and an outlet for fuel;

a filter element disposed within said filter chamber and positioned between said inlet and said outlet for fuel;

an inner housing assembly positioned within said filter chamber, said inner housing assembly defining an inner chamber in fluid communication with said filter chamber;

a source of a fuel additive disposed within said inner chamber; and     a semipermeable membrane and a thermostat positioned to control fuel flow into said inner chamber.

17. The fuel filter of claim 16 wherein said fuel additive is coated with a hydrocarbon insoluble coating.

18. The fuel filter of claim 16 wherein said source of fuel additive includes a plurality of soluble fuel additive pellets.

19. The fuel filter of claim 16 wherein the thermostat opens in response to fuel that is sufficiently warm.

\* \* \* \* \*